United States Patent
Eyaa Allogo et al.

(10) Patent No.: US 12,227,690 B2
(45) Date of Patent: Feb. 18, 2025

(54) MONOVALENT BRINE-BASED RESERVOIR DRILLING FLUID

(71) Applicant: Schlumberger Technology Corporation, Sugar Land, TX (US)

(72) Inventors: Clotaire-Marie Eyaa Allogo, Sugar Land, TX (US); Raymond Ravitz, Houston, TX (US); Sooi Kim Lim, Aberdeen (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/453,397

(22) Filed: Aug. 22, 2023

(65) Prior Publication Data

US 2023/0392065 A1     Dec. 7, 2023

Related U.S. Application Data

(62) Division of application No. 15/742,869, filed as application No. PCT/US2016/041411 on Jul. 8, 2016, now Pat. No. 11,767,457.

(60) Provisional application No. 62/189,990, filed on Jul. 8, 2015.

(51) Int. Cl.
    *C09K 8/08*     (2006.01)
    *C09K 8/504*     (2006.01)
    *C09K 8/512*     (2006.01)
    *C09K 8/514*     (2006.01)

(52) U.S. Cl.
    CPC .............. *C09K 8/08* (2013.01); *C09K 8/5045* (2013.01); *C09K 8/512* (2013.01); *C09K 8/514* (2013.01); *C09K 2208/18* (2013.01); *C09K 2208/24* (2013.01); *C09K 2208/26* (2013.01)

(58) Field of Classification Search
    CPC ............ C09K 2208/18; C09K 2208/24; C09K 2208/26; C09K 8/08; C09K 8/5045; C09K 8/512; C09K 8/514; C09K 2208/22; C09K 8/04; C09K 8/20
    See application file for complete search history.

(56) References Cited

U.S. PATENT DOCUMENTS

| | | |
|---|---|---|
| 6,300,286 B1 | 10/2001 | Dobson, Jr |
| 6,325,149 B1 | 12/2001 | Dobson, Jr |
| 6,391,830 B1 | 5/2002 | Dobson, Jr |
| 6,576,597 B2 | 6/2003 | Dobson, Jr |
| 7,387,985 B2 | 6/2008 | Kippie |
| 7,998,908 B2 | 8/2011 | Rimassa |
| 8,685,900 B2 | 4/2014 | Ezell |
| 2004/0192561 A1 | 9/2004 | Kippie |
| 2006/0135372 A1* | 6/2006 | Hossaini ............ C09K 8/52 507/200 |
| 2013/0130944 A1 | 5/2013 | Dobson, Jr |
| 2013/0261032 A1 | 10/2013 | Ladva |
| 2018/0201820 A1 | 7/2018 | Eyaa Allogo |

FOREIGN PATENT DOCUMENTS

| | | |
|---|---|---|
| WO | 2014074473 A1 | 5/2014 |
| WO | 2015034479 A1 | 3/2015 |

OTHER PUBLICATIONS

Exam Report under Section 18(3) issued in United Kingdom patent Application No. GB1721329.9 dated Apr. 28, 2021, 6 pages.
International Preliminary Report on Patentability for the equivalent International patent application PCT/US2016/041411 mailed on Jan. 18, 2018.
Examination Report for the equivalent Canadian patent application 2991245 mailed on Nov. 19, 2018.
Search Report and Written Opinion of International Patent Application No. PCT/US2016/041411 mailed on Oct. 12, 2016.
Allogo, C. M. et al., "Case History of Laboratory Design and Field Application of Biopolymer Free Fluids for an Open Hole Gravel Pack", SPE-170310-MS, presented at the SPE Deepwater Drilling and Completions Conference, Galveston, Texas, USA, 2014, 12 pages.
Bellarby, J., "Well Completion Design: Chapter 7 §7.1: Mineral Scales", GPP Elsevier, Amsterdam, The Netherlands, 2009, 64 pages.
Civan, F., "Reservoir Formation Damage 2nd Edition: Chapter 9 Crystal Growth and Scale Formation in Porous Media", GPP-Elsevier Burlington, MA, USA, 2007, 23 pages.
Fink, J., "Hydraulic Fracturing Chemicals and Fluids Technology: Chapter 11: Scale Inhibitors", GPP-Elsevier, Waltham, MA, USA, 2013, 20 pages.
Horton, R. L. et al., "A New Biopolymer-Free, Low-Solids, High-Density Reservoir Drilling Fluid: Laboratory and Field Implementation" SPE 87664, SPE Drilling and Completion, 2004, 19(01), pp. 29-39.
Horton, R. L. et al., "Enhanced Well Productivity Potential from a New HighDensity Reservoir Drilling Fluid". AADE 01-NC-HO-47, American Association of Drilling Engineers 2001 National Drilling Conference, Mar. 27-29, 2001, 17 pages.
Luyster, M. R. et al., "Development of a Delayed-Chelating Cleanup Technique for Openhole Gravel Pack Horizontal Completions Using a Reversible Invert Emulsion Dril-In System", SPE-98242-MS, presented at the SPE International Symposium and Exhibition on Formation Damage Control, Lafayette, Louisiana, USA, 2006, 19 pages.

\* cited by examiner

*Primary Examiner* — Frances Tischler
(74) *Attorney, Agent, or Firm* — Jeffrey D. Frantz

(57) ABSTRACT

Wellbore fluids may contain an aqueous base fluid comprising a monovalent brine, a modified starch, and a metal oxide. Methods of using wellbore fluids may include drilling a subterranean well while circulating a wellbore fluid into the subterranean well, wherein the wellbore fluid contains an aqueous base fluid comprising a monovalent brine, a modified starch, and a metal oxide.

9 Claims, No Drawings

MONOVALENT BRINE-BASED RESERVOIR DRILLING FLUID

CROSS-REFERENCE TO RELATED APPLICATION

The present application is a divisional of U.S. patent application Ser. No. 15/742,869, filed on Jan. 8, 2018, which was the National Stage of International Application No. PCT/US2016/041411, filed on Jul. 8, 2016, which claims priority to U.S. Provisional Application Ser. No. 62/189,990, filed on Jul. 8, 2015. Each of the above applications is incorporated herein by reference in its entirety.

BACKGROUND

During the drilling of a wellbore, various fluids are typically used in the well for a variety of functions. The fluids may be circulated through a drill pipe and drill bit into the wellbore, and then may subsequently flow upward through the wellbore to the surface. During this circulation, a drilling fluid may act to remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the formation by providing sufficient hydrostatic pressure to prevent the ingress of formation fluids into the wellbore, to cool and lubricate the drill string and bit, and/or to maximize penetration rate.

Other wellbore fluids include completion fluids used in the wellbore following drilling operations. Completion fluids broadly refer to any fluid pumped down a well after drilling operations have been completed, including fluids introduced during acidizing, perforating, fracturing, workover operations, etc. For example, reservoir drill-in fluid (RDF) is a specific type of completion fluid that is designed to drill and complete the reservoir section of a well in an open hole that is responsible for hydrocarbon production. RDF fluids may protect the formation from damage and fluid loss, while remaining removable when exposed to breaker fluids to minimize impediments to future production.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to wellbore fluids that include at least an aqueous base fluid with a monovalent brine, a modified starch, and a metal oxide.

In another aspect, embodiments disclosed herein relate to methods of drilling a subterranean well that include at least drilling the subterranean well while circulating a wellbore fluid in the subterranean well, where the wellbore fluid includes at least an aqueous base fluid and a modified starch, where the aqueous base fluid includes at least a monovalent brine.

In another aspect, embodiments disclosed herein relate to a method of reducing the loss of fluid out of a subterranean well, where the method includes at least injecting into the subterranean well a wellbore fluid, where the wellbore fluid includes at least an aqueous base fluid containing a monovalent brine; a modified starch; and a metal oxide.

In another aspect, embodiments disclosed herein relate to a method of completing a wellbore, where the method includes at least drilling the wellbore with a wellbore fluid to form a filter cake on the walls of the wellbore, emplacing a breaker fluid into the wellbore, and shutting in the well for a period of time sufficient to initiate breaking of the filter cake. In such aspects, the wellbore fluid includes at least an aqueous base fluid containing a monovalent brine; and a modified starch.

Other aspects and advantages of the claimed subject matter will be apparent from the following description and the appended claims.

DETAILED DESCRIPTION

In one aspect, embodiments disclosed herein relate to wellbore fluids formulated from monovalent brines while maintaining favorable low high-end rheology and high low-end rheology and ease of filter cake cleanup using any of acids, chelating agents, and oxidizers. Further, wellbore fluids in accordance with the present disclosure may generate a low viscosity fluid with fluid loss control properties that may reduce the need for divalent brines often added to increase density and suspension properties.

During drilling, a filter cake may build up as particles and materials of varying sizes and types from wellbore fluids are deposited and accumulate on the walls of the borehole. Prior to production, the filter cake may be removed to some degree, either physically or chemically using breaker fluids that may contain acids, oxidizers, and/or enzymes, for example. However, additives used in standard drilling fluids such as weighting solids and polymeric fluid loss materials may be resistant to degradation and conventional breaker fluids leaving residues that may hinder efficient hydrocarbon production, particularly when drilling fluid residues are present in producing intervals.

In order to overcome the problems of formation damage associated with standard drilling fluids, a specialty fluid having a limited amount of solids and often degradable polymeric additives known as a reservoir drill-in fluid (RDF) may be used when drilling through the reservoir section of a wellbore. Particularly, RDFs may be formulated to minimize damage and maximize production of exposed zones. In some respects, an RDF may resemble a completion fluid. For example, drill-in fluids may be brines containing only selected solids of appropriate particle size ranges (often removable salts such as calcium carbonate) and fluid loss additives. Because completeness of removal and maximization of production of hydrocarbons can be significant weighting factors, it may be desirable in some embodiments to limit the inclusion of additives into the drill-in fluid to those essential for filtration control and removal of cuttings from the wellbore.

While divalent brines are often used to formulate wellbore fluids, including RDFs, divalent species present in the brines are known to cause scaling and impact subsequent cleaning and removal operations negatively, often by forming poorly soluble carbonate and sulfate scales. Compounding the situation, when drilling through formation intervals, connate waters may be released from the surrounding rock. Connate waters often contain varying concentrations of native divalent species cations, including alkaline or alkali metals such as calcium and magnesium, or species that may form insoluble complexes when mixed with injected wellbore fluids. In some cases, the mixture of native water with wellbore fluids may cause adverse changes in the wellbore fluid composition such as precipitation of components of the wellbore fluid, changes in fluid density, pH variances, etc.

In one or more embodiments, wellbore fluids in accordance with the present disclosure may be formulated from a monovalent brine and minimal or no divalent ions to increase the compatibility of injected wellbore fluids with formation fluids and minimize adverse interactions such as the production of insoluble scales and other precipitates. Decreased reliance of divalent brines may also aid completions and cleanup operations by allowing the use of breaker fluids that incorporate chelating agents or other breakers that are negatively impacted by the presence of divalent ions.

In order to facilitate removal of filter cakes prior to production operations, wellbore fluids in accordance with the present disclosure may also be formulated without incorporating biopolymer viscosifiers that may otherwise contribute to formation damage and decreased production. Biopolymers are often incorporated in drilling fluids, particularly fluids formulated with monovalent brines, in order to impart favorable rheological characteristics, in addition to increasing the stability of the drilling fluid at elevated temperatures. However, the increased viscosity and durability of biopolymer additives also introduces added challenges in removing such additives prior to production because standard breaker fluids are often unable to remove enough of the generated filter cakes to allow sufficient production levels.

As used herein, the term "biopolymer viscosifier" is intended to mean an extracellular polysaccharide of high molecular weight, such as in excess of 500,000 Da, produced by fermentation of a carbohydrate source by the action of bacteria or fungi. Representative microorganisms may include the genus *Xanthomonas, Pseudomonas, Agrobacterium, Arthrobacter, Rhizobium, Alcaligenes, Beijerincka*, and *Sclerotium*. Biopolymers that are often incorporated into wellbore fluids, but that may be excluded from the present fluids, include xanthan gum, welan gum, gellan gum, scleroglucan gum, succinoglycan gum, and the like.

Instead, wellbore fluids of the present disclosure may incorporate a modified starch additive that provides ample rheological, fluid loss, and clean-up properties needed to function as an RDF. Further, while it is commonly believed that divalent brines are required in the absence of biopolymer viscosifiers in order to obtain a drilling fluid having sufficient viscosity and suspension properties, inventors of the present disclosure have discovered that wellbore fluids may be formulated in a monovalent brine base fluid when modified starch additives are supplemented with limited concentrations of metal oxides. Thus, an RDF may be formulated such that it remains compatible when mixed with formation fluids containing divalent salts, yet retains favorable rheological characteristics, including suspension of drill cuttings and insoluble fluid components, in a monovalent brine. The metal oxides are present in a limited quantity as compared to the concentration of divalent species generally present in a divalent brine (i.e., by at least an order of magnitude smaller). For example, in one or more embodiments, the wellbore fluid of the present disclosure may have no more than 5 percent by weight of the fluid (wt %) (or no more than 2 to 3 wt % in other embodiments) of an alkaline earth metal (in any form, such as a salt, metal oxide, etc.).

While the fluids of the present disclosure may be particularly suitable for use in drilling a producing interval of a wellbore, one skilled in the art would appreciate that no limitation on the scope of the present disclosure exists, and wellbore fluids of the present disclosure may be used to drill within a wellbore irrespective of whether drilled interval corresponds to the producing region. Further, wellbore fluids in accordance with the present disclosure may have utility in reducing the scaling attributed to divalent species in completions, displacement, hydraulic fracturing, work-over, under-reaming, packer fluid emplacement or maintenance, well treating, or testing operations.

In one or more embodiments, RDFs in accordance with the present disclosure may include a monovalent base fluid, a modified starch, and a metal oxide. In some embodiments, wellbore fluids may be formulated with a density of up to 13.5 pounds per gallon (ppg) or greater. In other embodiments, the density of the final wellbore fluid may be within the range of 8.5 ppg to 13.5 ppg.

Monovalent Brines

In one or more embodiments, monovalent brines of the present disclosure may be selected from brines such as, but not limited to, ammonium chloride, lithium bromide, lithium chloride, lithium nitrate, sodium bromide, sodium chloride, sodium nitrate, potassium chloride, potassium bromide, potassium nitrate, cesium nitrate, cesium chloride, cesium bromide, and the like. Other possible monovalent brines include formate salts such as cesium, potassium, and/or sodium.

The monovalent brine may be included in the wellbore fluids in an amount enough to achieve a suitable density for use in well-drilling operations. In some embodiments, the density of the monovalent brine in pounds per gallon (ppg) may range from a lower limit of greater than 3 ppg, 5 ppg, 7 ppg, 9 ppg to an upper limit of less than 11 ppg, 13 ppg, 15 ppg, 17 ppg, 19 ppg, where the density may range from any lower limit to any upper limit. However, one skilled in the art would appreciate that the amount may vary depending on the density of the wellbore fluid desired for a particular application.

Modified Starch

Wellbore fluids in accordance with the present disclosure may include a modified starch to impart fluid loss control properties, including at elevated temperatures. Starch is a natural polymer formed from anhydroglucose that may contain a number of free secondary hydroxyls and primary hydroxyls. These hydroxyls potentially are able to react with any chemical capable of reacting with alcoholic hydroxyls. This may include a wide range of compounds such as acid anhydrides, organic halogenated compounds, aldehydes, epoxy, olefins, etc.

Modified starches in accordance with the present disclosure may include chemically modified starches, including starch treated with a number of multi-functional crosslinking agents. Crosslinking agents may contain two or more moieties capable of reacting with hydroxyl groups present on the same molecule or on different molecules. Crosslinking agents may include, for example, epihalohydrins, formaldehyde, phosphorous oxychloride, trimetaphosphates, adipic-acetic anhydrides, dialdehydes, vinyl sulfone, diepoxides, diisocyanates, bis(hydroxymethyl) ethylene urea, and the like. Further, one skilled in the art would appreciate that the base material for crosslinking may be a chemically modified starch, such as a starch having a portion of its hydroxyl groups replaced by either ester or ether groups. For example, a portion of the hydroxyl groups may be etherified with propylene oxide to form a hydroxypropyl starch or etherified with monochloroacetic acid to form a carboxymethyl starch; however, alkoxylated starches or starch esters such as starch acetates may also be used.

Selection between esterified/etherified starch and/or crosslinked starch may, for example, be dependent on the particular wellbore operation and formation in which the fluid is being used. For example, one skilled in the art would appreciate that depending on the expected temperatures a crosslinked starch may provide additional thermal stability to the fluid.

In one or more embodiments, modified starches include starches derived from any plant source such as corn, wheat, rice, tapioca, sago, waxy maize, waxy rice, sorghum, potato, pea, roots containing a high starch content, etc. Starch consists of linked anhydro-D-glucose units having either a mainly linear structure (amylose) or a branched structure (amylopectin). However, one skilled in the art would appreciate that a single plant species may exist with certain proportions of amylose and amylopectin, and that hybrids with varying proportions may also exist. Further, it is known that "starch" may also refer to common starch, which contains both amylose and amylopectin molecules, or amylopectin-based starches such as waxy starch. In some embodiments, the starch additive may be a commercially available additive such as DITROL available from M-I, L.L.C.

Modified starches in accordance with the present disclosure may be added to a wellbore fluid at a concentration that ranges from 1 to 20 pounds of modified starch per barrel (ppb) in some embodiments, and from 3 to 18 ppb in other embodiments. However, the effective amount of modified starch may vary depending on the other components of the wellbore fluid, as well as the characteristics and conditions of the formation in which it is employed.

Metal Oxides

Wellbore fluids in accordance with the present disclosure may include one or more metal oxides that may impart favorable rheology on the wellbore fluid by interacting with the modified starch and/or modifying and buffering the pH of the wellbore fluid. For example, a metal oxide such as MgO, may participate in crosslinking reactions with a modified starch that increases the viscosity of the wellbore fluid, in addition to increasing the pH of the wellbore fluid. Metal oxides may include divalent metal oxides such as cupric oxide, magnesium oxide, calcium oxide, iron oxide, and zinc oxide. In some embodiments, metal oxides may be of the formula MO where M represents a divalent metal of one of the Periodic Table Groups 2, 8, 9, 10, 11 and 12 and mixtures thereof.

In one or more embodiments, the reactivity of the metal oxide may be increased by increasing the surface area of the oxide through grinding or milling to produce a powder or dust. For example, one suitable form of magnesium oxide is a very fine powder in a highly reactive form, i.e., having small particle size, high surface area, and ready accessibility for reaction. One example of such a fine powder magnesium oxide is available commercially from M-I LLC under the trade name of DIBALANCE™.

Wellbore fluids in accordance with the present disclosure may contain a concentration of a metal oxide that may range from 0.5 ppb to 10 ppb in some embodiments, from 1 ppb to 8 ppb or 2 ppb to 5 ppb in other embodiments.

Other Wellbore Fluid Additives

Other additives for use in wellbore fluids may include for example, fluid loss control agents, mutual solvents, wetting agents, organophilic clays, viscosifiers, surfactants, dispersants, interfacial tension reducers, mutual solvents, thinners, thinning agents and cleaning agents. The addition of such agents should be well known to one of ordinary skill in the art of formulating drilling fluids and muds.

In one or more embodiments, an amine stabilizer may be used as a pH buffer and/or thermal extender to prevent acid-catalyzed degradation of polymers present in the fluid. A suitable amine stabilizer may include triethanolamine; however, one skilled in the art would appreciate that other amine stabilizers such as methyldiethanol amine (MDEA), dimethylethanol amine (DMEA), diethanol amine (DEA), monoethanol amine (MEA), cyclic organic amines, sterically hindered amines, amides of fatty acid, or other suitable tertiary, secondary, and primary amines and ammonia could be used in the fluids of the present disclosure.

In some embodiments, the amine stabilizer may be commercially available amine stabilizers such as PTS-200, or polyether amines such as the JEFFAMINE series of polyether amines including Jeffamine D-230, all of which are available from M-I L.L.C. (Houston, TX). Amine stabilizers may be added to a wellbore fluid in accordance with the present disclosure at a concentration that ranges from 0.1% to 10% by weight of the wellbore fluid in some embodiments, and from 0.5% to 5% by weight of the wellbore fluid in other embodiments.

If necessary, the density of the fluid may be increased by incorporation of at least one solid material, such as a bridging agent or weighting agent, may be included in the wellbore fluids of the present disclosure. Bridging particles, weighting agents or density materials suitable for use in some embodiments include galena, hematite, magnetite, iron oxides, ilmenite, barite, siderite, celestite, dolomite, calcium carbonate, silica, and the like. Alternatively, such materials may also include fibrous cellulosic materials, graphite, coke, perlite, etc. The quantity of such material added, if any, depends upon the desired density of the final composition. Typically, weight material is added to result in a drilling fluid density of up to about 24 pounds per gallon (ppg). The weight material may be added up to 21 ppg and, in other embodiments, up to 19.5 ppg. In one embodiment, calcium carbonate may be used as a bridging agent in forming a filter cake.

Breaker Fluids

Further, a breaker fluid may be emplaced in a wellbore drilled with the fluids of the present disclosure when clean-up/removal of a filter cake is desired. The breaker may be selectively emplaced in the wellbore, for example, by spotting the fluid through a coil tube or by bullheading. However, no limitation on the techniques by which the breaker fluid of the present disclosure is emplaced is intended on the scope of the present application. After a period of time sufficient, i.e., several hours to several days, to allow for disruption or fragmentation of the filter cake and the fluid may be returned to the surface for collection and subsequent recovery techniques. Subsequent washes of the wellbore with wash fluids may be desirable to ensure complete removal of filter cake material remaining therein. Various types of breakers are known in the art, and no limitation is intended on the type of breaker(s) that may be used to disrupt filter cakes formed from wellbore fluids of the present disclosure. Rather, it is envisioned that any of enzyme, solvent, chelant, acidizing, or oxidizing breakers may be used in breaking such filter cakes. In a particular embodiment, it may be desirable to include an enzyme/solvent/acid breaker combination for breaking the crosslinked starch, viscosified surfactant, and bridging solids.

The breaker fluids of the present disclosure may also be formulated to contain an acid source to decrease the pH of the breaker fluid and aid in the degradation of filter cakes within the wellbore. Examples of acid sources that may be used as breaker fluid additives include strong mineral acids, such as hydrochloric acid or sulfuric acid, and organic acids, such as citric acid, salicylic acid, lactic acid, malic acid, acetic acid, and formic acid. Suitable organic acids that may be used as the acid sources may include citric acid, salicylic acid, glycolic acid, malic acid, maleic acid, fumaric acid, and homo- or copolymers of lactic acid and glycolic acid as well as compounds containing hydroxy, phenoxy, carboxylic, hydroxycarboxylic or phenoxycarboxylic moieties.

Alternatively, a delayed acid source may be used which reduces the pH of the wellbore fluid over a period of time. In particular, compounds that hydrolyze to form acids in situ may be utilized. Such delayed source of acidity may be provided, for example, by hydrolysis of an ester or amide. It is well known in the art that temperature, as well as the presence of hydroxide ion source, has a substantial impact on the rate of hydrolysis of esters. For a given acid, such as formic acid, for example, one of skill in the art can conduct simple studies to determine the time to hydrolysis at a given temperature. It is also known that as the length of the alcohol portion of the ester increases, the rate of hydrolysis decreases. Thus, by systematically varying the length and branching of the alcohol portion of the ester, the rate of release of acid may be controlled, and thus the setting of the wellbore fluid may be predetermined.

Illustrative examples of such delayed acid sources include hydrolyzable anhydrides of carboxylic acids, hydrolyzable esters of carboxylic acids, hydrolyzable esters of phosphonic acid, and hydrolyzable esters of sulfonic acid. Breaker fluids in accordance with this disclosure may include delayed acid sources such as, for example, $R^1H_2PO_3$, $R^1R^2HPO_3$, $R^1R^2R^3PO_3$, $R^1HSO_3$, $R^1R^2SO_3$, $R^1H_2PO_4$, $R^1R^2HPO_4$, $R^1R^2R^3PO_4$, $R^1HSO_4$, or $R^1R^2SO_4$, where $R^1$, $R^2$, and $R^3$ are $C_2$ to $C_{30}$ alkyl-, aryl-, arylalkyl-, or alkylaryl-groups.

Suitable esters may include carboxylic acid esters so that the time to achieve hydrolysis is predetermined on the known downhole conditions, such as temperature and pH. In a particular embodiment, the delayed acid source may include a formic or acetic acid ester of a C2-C30 alcohol, which may be mono- or polyhydric, such as ethylene glycol monoformate or diformate. Other esters that may find use in activating the internal breaker of the present disclosure include those releasing C1-C6 carboxylic acids, including hydroxycarboxylic acids formed by the hydrolysis of lactones, such as γ-lactone and δ-lactone). In another embodiment, a hydrolyzable ester of C1 to C6 carboxylic acid and a C2 to C30 poly alcohol, including alkyl orthoesters, may be used. In some embodiments, the delayed acid source may be the hydrolysable ester D-STRUCTOR™ available from M-I L.L.C. (Houston, TX).

Breaker fluids in accordance with the present disclosure may also incorporate one or more chelating agents. Chelating agents sequester polyvalent cations through bonds to two or more atoms of the chelating agent. Chelating agents may act to remove structural components from the filter cake, weakening the overall structure and aiding in filter cake removal. For example, cations sequestered by the chelants may be sourced from solid filter cake components including various weighting or bridging agents such as calcium carbonate, barium sulfate, etc. Useful chelating agents may include organic ligands such as ethylenediamine, diaminopropane, di aminobutane, diethylenetriamine, tri ethyl enetetramine, tetraethyl enep entamine, pentaethylenehexamine, tris(aminoethyl)amine, triaminopropane, diaminoethylpropane, diaminomethylpropane, diaminodimethylbutane, bipyridine, dipyridylamine, phenanthroline, aminoethylpyridine, terpyridine, biguanide and pyridine aldazine.

Chelating agents suitable for use in the breaker fluids of the present disclosure may include polydentate chelating agents such as ethylenediaminetetraacetic acid (EDTA), diethylenetriaminepentaacetic acid (DTPA), nitrilotriacetic acid (NTA), ethylene glycol-bis(2-aminoethyl)-N,N,N',N'-tetraacetic acid (EGTA), 1,2-bis(o-aminophenoxy)ethane-N,N,N',N'-tetraaceticacid (BAPTA), cyclohexanediaminetetraacetic acid (CDTA), triethylenetetraaminehexaacetic acid (TTHA), N-(2-Hydroxyethyl)ethylenediamine-N,N',N'-triacetic acid (HEDTA), glutami c-N,N-diacetic acid (GLDA), ethylene-diamine tetra-methylene sulfonic acid (EDTMS), diethylenetriamine penta-methylene sulfonic acid (DE-TPMS), amino tri-methylene sulfonic acid (ATMS), ethyl-ene-diamine tetra-methylene phosphonic acid (EDTMP), diethylenetriamine penta-methylene phosphonic acid (DE-TPMP), amino tri-methylene phosphonic acid (ATMP), and mixtures thereof. Such chelating agents may include potassium or sodium salts thereof in some embodiments. However, this list is not intended to have any limitation on the chelating agents (or salt types) suitable for use in the embodiments disclosed herein.

EXAMPLES

Example 1—Rheological Properties of Monovalent RDF Formulations

In the following example, the rheological characteristics of monovalent RDF formulations were compared to an equivalent divalent brine-based RDF. Wellbore fluids were prepared by combining the fluid components as shown below in Table 1 for monovalent RDF, and Table 3 for the comparative divalent formulation, taking into account samples of various metal oxides; a phosphonic acid scale inhibitor; a chemically modified starch; and a calcium carbonate weighting agent; all of which are commercially available from M-I L.L.C.

Results from the rheological measurements are shown in Tables 2 and 4 for the monovalent and divalent RDFs, respectively. As demonstrated, the monovalent formulations have similar rheological profiles and densities to RDFs formulated using a divalent base brine.

TABLE 1

| Divalent RDF Formulations | | | | |
|---|---|---|---|---|
| | C1 | C2 | C3 | C4 |
| Density (ppg) | 9.5 | 9.5 | 10.3 | 10.3 |
| Brine Type | $CaCl_2$ | $CaBr_2$ | $CaCl_2$ | $CaBr_2$ |
| Base Brine Density (ppg) | 8.68 | 8.68 | 9.54 | 9.54 |
| Components (ppb) | | | | |
| 11.6 $CaCl_2$ | 48.0 | — | 167.0 | — |
| 14.2 $CaBr_2$ | — | 31.0 | — | 113.0 |
| water | 292.0 | 304.0 | 206.0 | 256.0 |
| modified starch | 10.0 | 10.0 | 10.0 | 10.0 |
| metal oxide #1 | 2.0 | 2.0 | 2.0 | 2.0 |
| metal oxide #2 | 2.0 | 2.0 | 0.50 | 0.50 |
| metal oxide #2 | 4.0 | 4.0 | 2.0 | 2.0 |
| sized $CaCO_3$ | 45.0 | 45.0 | 45.0 | 45.0 |

TABLE 2

Rheological Properties of Divalent brine-based RDFs

| Sample No. | C1 | | C2 | | C3 | | C4 | |
|---|---|---|---|---|---|---|---|---|
| Aging Time | Initial | 16 h | Initial | 16 h | Initial | 16 h | Initial | 16 h |
| Aging Temp. (° F.) | | | | | 180 | | | |
| Aging Mode | Dynamic | | Dynamic | | Dynamic | | Dynamic | |
| Measurement Temp. (° F.) | | | | | 120 | | | |
| 600 RPM | 39 | 45 | 42 | 42 | 52 | 57 | 49 | 50 |
| 300 RPM | 30 | 32 | 32 | 29 | 36 | 40 | 34 | 35 |
| 200 RPM | 28 | 26 | 27 | 23 | 30 | 33 | 28 | 29 |
| 100 RPM | 23 | 20 | 22 | 16 | 20 | 24 | 20 | 20 |
| 6 RPM | 8 | 9 | 6 | 6 | 9 | 9 | 6 | 7 |
| 3 RPM | 7 | 8 | 5 | 5 | 8 | 8 | 5 | 6 |
| Gel 10 Sec (lb/100 ft$^2$) | 9 | 10 | 7 | 7 | 9 | 8 | 6 | 7 |
| Gel 10 Min (lb/100 ft$^2$) | 10 | 11 | 9 | 9 | 9 | 10 | 8 | 9 |
| PV (cP) | 9 | 13 | 10 | 13 | 16 | 17 | 15 | 15 |
| YP (lb/100 ft$^2$) | 21 | 19 | 22 | 16 | 20 | 23 | 19 | 20 |

TABLE 3

Monovalent RDF Formulations

|  | 1 | 2 | 3 | 4 |
|---|---|---|---|---|
| Density (ppg) | 9.5 | 9.5 | 10.3 | 10.3 |
| Brine Type | NaBr | NaCl | NaBr | NaCl |
| Base Brine Density (ppg) | 8.68 | 8.68 | 9.54 | 9.54 |
| Components (ppb) | | | | |
| 12.4 NaBr | 45.0 | — | 134.0 | — |
| NaCl | — | 21.0 | — | 75.0 |
| water | 299.0 | 318.0 | 232.0 | 299.0 |
| modified starch | 10.0 | 10.0 | 10.0 | 10.0 |
| metal oxide #1 | 2.0 | 2.0 | 2.0 | 2.0 |
| metal oxide #2 | 2.0 | 2.0 | 0.50 | 0.50 |
| metal oxide #2 | 4.0 | 4.0 | 2.0 | 2.0 |
| SAFE-CARB 40 | 45.0 | 45.0 | 45.0 | — |

TABLE 4

Rheological Properties of monovalent brine-based RDFs

| Sample No. | 1 | | 2 | | 3 | | 4 | |
|---|---|---|---|---|---|---|---|---|
| Aging Time | Initial | 16 h | Initial | 16 h | Initial | 16 h | Initial | 16 h |
| Aging Temp. (° F.) | | | | | 180 | | | |
| Aging Mode | Dynamic | | Dynamic | | Dynamic | | Dynamic | |
| Measurement Temp. (° F.) | | | | | 120 | | | |
| 600 RPM | 43 | 53 | 37 | 42 | 40 | 45 | 37 | 40 |
| 300 RPM | 35 | 44 | 30 | 36 | 28 | 33 | 27 | 28 |
| 200 RPM | 30 | 39 | 27 | 33 | 24 | 27 | 22 | 24 |
| 100 RPM | 25 | 32 | 22 | 27 | 18 | 20 | 18 | 18 |
| 6 RPM | 14 | 15 | 12 | 14 | 9 | 9 | 9 | 8 |
| 3 RPM | 13 | 14 | 11 | 13 | 7 | 8 | 8 | 7 |
| Gel 10 Sec (lb/100 ft$^2$) | 14 | 13 | 11 | 13 | 8 | 9 | 8 | 8 |
| Gel 10 Sec (lb/100 ft$^2$) | 14 | 15 | 12 | 13 | 9 | 10 | 9 | 9 |
| PV (cP) | 8 | 9 | 7 | 6 | 12 | 12 | 10 | 12 |
| YP (lb/100 ft$^2$) | 27 | 35 | 23q | 30 | 16 | 21 | 17 | 16 |

Example 2A—Monovalent RDF Formulation

In the following example, monovalent RDF formulations are prepared and characterized. As shown below in Table 5, components were combined to produce a water-based RDF having a final density of 13.5 lb/gal, components including metal oxide #1, which is a highly reactive metal oxide; a phosphonic acid scale inhibitor; and a chemically modified starch; all of which are commercially available from M-I L.L.C.

TABLE 5

Monovalent RDF formulations tested in Example 2

| | Sample No. | | |
|---|---|---|---|
| | 5 | 6 | 7 |
| Component | g/L | g/L | g/L |
| 9.67 ppg NaCl/KCl brine | 346.62 | 339.37 | 339.37 |
| Water | 15.94 | 32.38 | 32.38 |
| DITROL | 10 | 10 | 10 |
| metal oxide #1 | 2 | 2 | 2 |
| metal oxide #2 | 0.5 | 1.5 | 1.5 |
| metal oxide #3 | 2 | 2 | 2 |
| polyglycol | 10.50 | — | 3.5 |
| sized $CaCO_3$ 2 | 1 | 1 | 1 |
| sized $CaCO_3$ 10 | — | — | 2 |
| sized $CaCO_3$ 20 | — | — | 2 |
| sized $CaCO_3$ 40 | 38 | 38 | 35 |
| sized $CaCO_3$ 250 | 6 | 6 | 5 |

Following the preparation of the wellbore fluid formulations, the rheology of the sample fluids was studied, both after initial formulation and after 16 hours of dynamic aging by "hot rolling." Rheological properties were measured using a Fann 35 rheometer as shown in Table 6, and separately with a Brookfield rheometer as shown in Table 7.

TABLE 6

Rheological properties of RDF formulations

| Sample No. | 5 | | 6 | | 7 | |
|---|---|---|---|---|---|---|
| Heat Aging Temp., F. | — | 225 | — | 225 | — | 225 |
| Heat Aging Hours | Initial | 16 h Hot roll (HR) | Initial | 16 h HR | Initial | 16 h HR |
| Mud weight, ppg | | 10.3 | | 10.3 | | 10.3 |
| pH | 10.0 | 8.9 | 9.8 | 9.1 | 9.9 | — |
| Fann 35 Rheology | | | | | | |
| Temperature | | | 120° F. | | | |
| 600 RPM | 42 | 44 | 48 | 54 | 45 | 49 |
| 300 RPM | 30 | 32 | 38 | 44 | 35 | 39 |
| 200 RPM | 25 | 27 | 34 | 38 | 31 | 34 |
| 100 RPM | 20 | 21 | 27 | 30 | 25 | 26 |
| 6 RPM | 10 | 19 | 12 | 13 | 12 | 11 |
| 3 RPM | 9 | 9 | 11 | 12 | 10 | 10 |
| Plastic Viscosity (cPo) | 12 | 12 | 10 | 10 | 10 | 10 |
| Yield Point (lb/100 ft$^2$) | 18 | 20 | 28 | 34 | 25 | 29 |
| 10 sec (lb/100 ft$^2$) | 10 | 11 | 11 | 13 | 13 | 11 |
| 10 min (lb/100 ft$^2$) | 16 | 15 | 16 | 16 | 15 | 14 |

TABLE 7

Brookfield Rheology

| Sample No. | 5 | | 6 | | 7 | |
|---|---|---|---|---|---|---|
| Spindle No. | | | S66 | | | |
| Temperature | | | 120° F. | | | |
| Heat Aging Hours | Initial | 16 hr | Initial | 16 hr | Initial | 16 hr |

TABLE 7-continued

Brookfield Rheology

| Sample No. | 5 | | 6 | | 7 | |
|---|---|---|---|---|---|---|
| LSRV 1 (cPo) | 55,788 | 48,890 | 68,386 | 40,992 | 61,998 | 45,495 |
| LSRV 2 (cPo) | 57,788 | 38,292 | 41,691 | 40,992 | 36,592 | 28,394 |
| LSRV 3 (cPo) | 57,788 | 34,393 | 36,792 | 27,298 | 29,494 | 21,195 |

Example 2B—Filter Cake Removal

In the following example, filter cakes were generated using the RDF formulations characterized in Example 1, and assays were conducted to study the efficiency of filter cake removal. During the assay, wellbore fluids were formulated as reservoir drill-in fluids (RDF) as shown in Table 5. The standard disk of 10, 20 and 35 microns were used as references to design the bridging solids blend for the RDF system. It should be noted that these disks have a measured porosity of approximately 50%, thus the fluid loss results should be regarded as "worst-case" scenario and any subsequent fluid loss evaluation that meets the specified target would exhibit equal if not better fluid loss in the field.

Breaker fluids were formulated as shown below in Table 8, where D-STRUCTOR is acid generating ester, combined with chelating agents #1 and #2, and A-272, a mixture of at least one of an alkylarylpyridium quaternary, alkyl thiol, methanol, propan-2-ol and ethoxylated alcohol surfactant utilized as an organic corrosion inhibitor in an acidic environment, all of which are commercially available from M-I L.L.C (Houston, TX).

TABLE 8

Breaker System Formulations

| | Breaker | | |
|---|---|---|---|
| Component | A ppb | B ppb | C ppb |
| D-STRUCTOR | 60.0 | — | — |
| chelating agent #1 | 115.0 | 115.0 | — |
| A-272 | 1.7 | — | — |
| 12.5 ppg NaBr | 279.8 | 233.0 | 251.8 |
| water | 68.9 | 107.0 | 80.5 |
| chelating agent #2 | — | — | 120.0 |

Four breaker tests were run on a filter cake built after four hours. Filter cakes generated from the test formulations were tested according to the following conditions: breaker test 1—a filter cake generated from formulation 1 was soaked for 5 days in breaker A, followed by return flow testing; breaker test 2—a filter cake generated from formulation 2 was soaked in breaker A for 5 days prior to return flow testing; breaker test 3—a filter cake generated from formulation 3 was soaked in breaker B for 3 days prior to return flow testing; and breaker test 4—a filter cake generated from formulation 3 was soaked in breaker C for 3 days prior to return flow testing.

A return flow test was conducted to determine the ability of the selected breaker fluids to disrupt and/or dissolve filter cakes generated by the monovalent RDFs. Prior to addition of the RDFs, an initial production direction flow on OFITE Aloxite Filter Disks FAO-20 was conducted at 1, 2, 3, 4 and 5 psi. Next, 4-hour filter cakes were generated for the respective wellbore fluids at 225° F./500 psi, followed by decanting the remaining wellbore fluid and adding ~100 mL of one of breaker formulations to the cell. The cell was then reassembled and a 100 psi differential was applied to the cell and the heat jacket was set to 225° F. Breakthrough measurements were then conducted by pressuring the cell up to a 500 psi differential, the bottom valve stem was opened, and the time until breakthrough was recorded. Once breakthrough occurred, the bottom valve was left open until 30 ml of effluent was collected or until 30 minutes of time had elapsed. After 30 ml of effluent had been collected or 30 minutes of time had elapsed, the cell was closed and the pressure was reduced to 100 psi differential and monitored over the specified time interval for the breaker test. The final production direction flow-back test was then conducted at 1, 2, 3, 4 and 5 psi. The flow percentages were recorded to compare the effectiveness of each individual breaker formulation. The cells were then disassembled and the residual filter cake/disk was then removed and examined for complete degradation. Results from the return flow testing are shown below in Table 9. Visual inspection of all remaining filter cakes showed substantial degradation and disruption of the filter cakes.

TABLE 9

Final flow rate and return flow rate

|  |  |  |  | Final Flow | |
| --- | --- | --- | --- | --- | --- |
| Breaker Test No. | Pressure, psi | Time, sec | Volume, mL | Flow Rate, mL/sec | Return Flow, % |
| 1 | 1 | 1.00 | 0 | 0 | 0 |
| Formulation 5 | 2 | 41.81 | 202.0 | 4.8 | 75.8 |
| Breaker A | 3 | 31.81 | 205.0 | 6.4 | 80.3 |
| 5 day soak | 4 | 26.25 | 208.0 | 7.9 | 84.8 |
|  | 5 | 22.94 | 214.0 | 9.3 | 84.4 |
|  | 5 | 22.66 | 213.0 | 9.4 | 85.1 |
| 2 | 1 | 1.0 | 0 | 0 | 0 |
| Formulation 6 | 2 | 168.13 | 200.0 | 1.2 | 18.7 |
| Breaker A | 3 | 124.35 | 200.0 | 1.6 | 20.0 |
| 5 day soak | 4 | 106.44 | 200.0 | 1.9 | 20.1 |
|  | 5 | 21.54 | 217.0 | 10.1 | 91.2 |
|  | 5 | 21.72 | 215.0 | 9.9 | 89.6 |
| 3 | 1 | 120.0 | 60.0 | 0.5 | 13.4 |
| Formulation 7 | 2 | 120.0 | 52.0 | 0.4 | 6.8 |
| Breaker B | 3 | 120.0 | 114.0 | 1.0 | 11.8 |
| 3 day soak | 4 | 62.0 | 201.0 | 3.2 | 34.7 |
|  | 5 | 41.9 | 202.0 | 4.8 | 43.6 |
|  | 5 | 42.03 | 207.0 | 4.9 | 44.6 |
| 4 | 1 | 90.2 | 212.0 | 2.3 | 63.0 |
| Formulation 7 | 2 | 37.25 | 205.0 | 5.5 | 86.4 |
| Breaker C | 3 | 28.22 | 207.0 | 7.3 | 91.4 |
| 3 day soak | 4 | 24.1 | 208.0 | 8.6 | 92.3 |
|  | 5 | 20.91 | 212.0 | 10.1 | 91.8 |
|  | 5 | 20.91 | 212.0 | 10.1 | 91.8 |

Wellbore fluids of the present disclosure may find particular use for drilling through producing intervals of a formation, where it may be particularly desirable to increase clean-up abilities, to maximize hydrocarbon recovery, or the like. In particular, the RDF of the present disclosure may be useful for drilling such target intervals based on the rheological properties, ease of removal, flowback qualities (including slight stimulation of well, increasing flowback), and compatibility with completion techniques. Further, rheological properties may include the viscosity at high shear values is sufficiently low to minimize pressure drops during drilling and the gel and viscosity values at low shear values are sufficiently high to keep the cuttings in suspension when the fluid circulation is stopped, reducing the formation of deposits.

Although the preceding description has been described herein with reference to particular means, materials, and embodiments, it is not intended to be limited to the particulars disclosed herein; rather, it extends to all functionally equivalent structures, methods and uses, such as are within the scope of the appended claims.

What is claimed:

1. A method of drilling a subterranean well, the method comprising:
   drilling the subterranean well while circulating a wellbore fluid in the subterranean well, wherein the wellbore fluid comprises:
      an aqueous base fluid comprising a monovalent brine;
      a modified starch; and
      a mixture of divalent metal oxides present at a concentration ranging from 2 pounds per barrel (ppb) to 5 ppb; wherein the wellbore fluid has no more than 3 wt % of alkaline earth metal in the wellbore fluid.

2. The method of claim 1, wherein the modified starch of the wellbore fluid is within a range of 3 ppb to 18 ppb.

3. The method of claim 1, wherein the wellbore fluid is used to drill a producing interval of the well.

4. A method of completing a wellbore, the method comprising:
   drilling the wellbore with a wellbore fluid to form a filter cake on walls thereof, the wellbore fluid comprising:
      an aqueous base fluid comprising a monovalent brine;
      a modified starch; and
      a mixture of divalent metal oxides present at a concentration ranging from 2 pounds per barrel (ppb) to 5 ppb; wherein the wellbore fluid has no more than 3 wt % of alkaline earth metal in the wellbore fluid;
   emplacing a breaker fluid into the wellbore; and
   shutting in the wellbore for a period of time sufficient to initiate breaking of the filter cake.

5. The method of claim 4, further comprising:
   gravel packing at least one interval of the wellbore.

6. The method of claim 4, further comprising:
   circulating a wash fluid through the wellbore prior to and/or after emplacing the breaker fluid.

7. The method of claim 4, wherein the modified starch comprises at least one of corn, wheat, rice, tapioca, sago, waxy maize, waxy rice, sorghum, potato, and pea as a starch source.

8. The method of claim 4, wherein the mixture of divalent metal oxides comprises magnesium oxide (MgO), calcium oxide (CaO), or zinc oxide (ZnO).

9. The method of claim 4, wherein the modified starch of the wellbore fluid is within a range of 3 ppb to 18 ppb.

* * * * *